June 28, 1927.

J. B. RAMOS 1,633,905

FARMING IMPLEMENT

Filed June 12, 1923

June 28, 1927.  
J. B. RAMOS  
FARMING IMPLEMENT  
Filed June 12, 1923

INVENTOR.
José B. Ramos
BY
ATTORNEY

Patented June 28, 1927.

1,633,905

UNITED STATES PATENT OFFICE.

JOSÉ B. RAMOS, OF HABANA, CUBA.

FARMING IMPLEMENT.

Application filed June 12, 1923, Serial No. 644,976, and in Cuba March 23, 1923.

This invention relates to farming implements and particularly to an apparatus for cutting the straw formed by the dried leaves of sugar cane plants into proper lengths to permit embedding of the straw in the soil as it is ploughed. The present invention is an improvement on the apparatus for which Letters Patent of the United States, No. 1,321,474, was granted to me November 11, 1919. One object of the present invention is to effect improvements in such apparatus to enable the same to do more work.

Another object is to improve the means for operating the straw cutting knife.

The invention is described with reference to the figures of the annexed drawings, in which.

Figure 1:
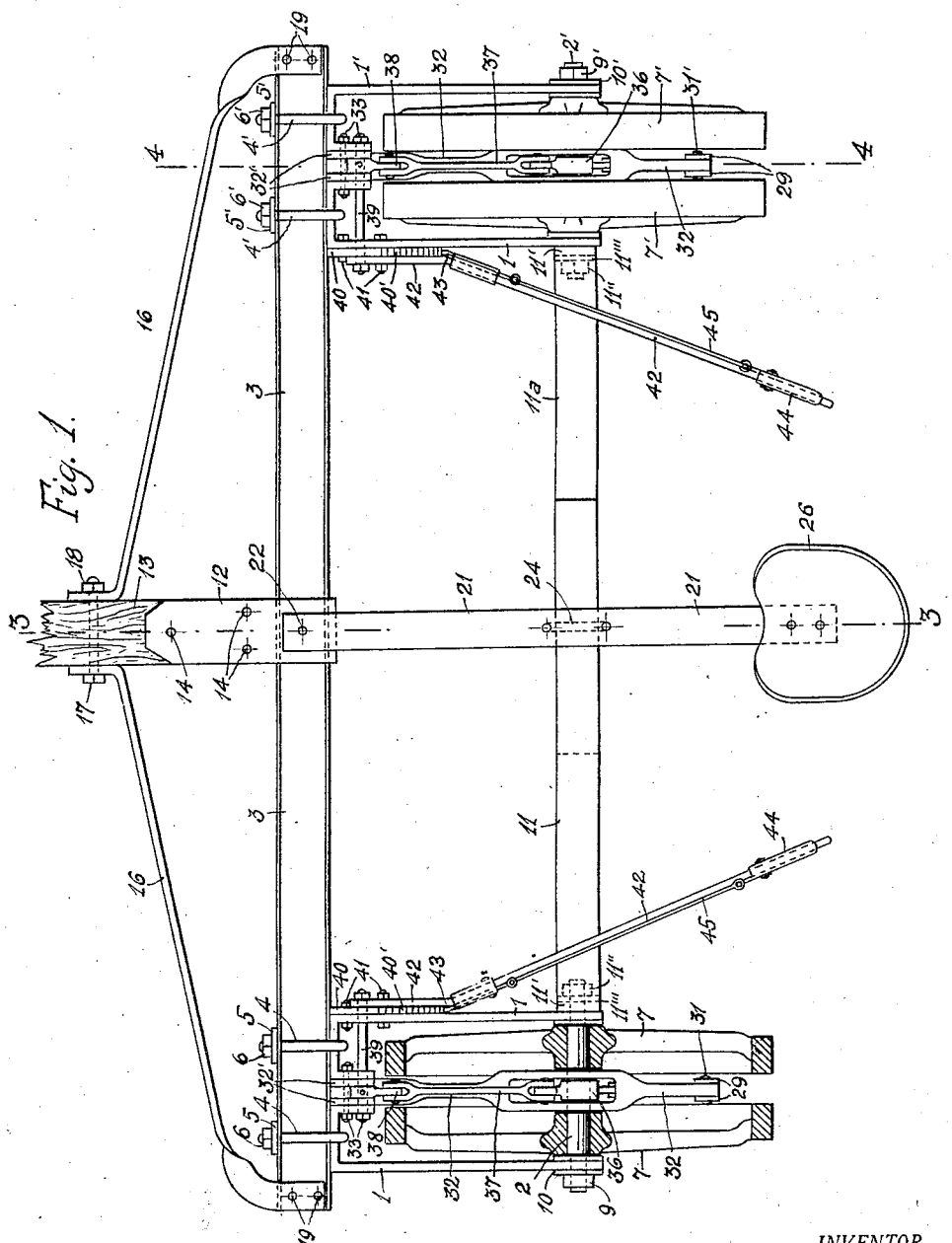
Figure 1 is a horizontal plan view of the apparatus provided with the improvements forming the subject matter of this invention.
Figure 2:
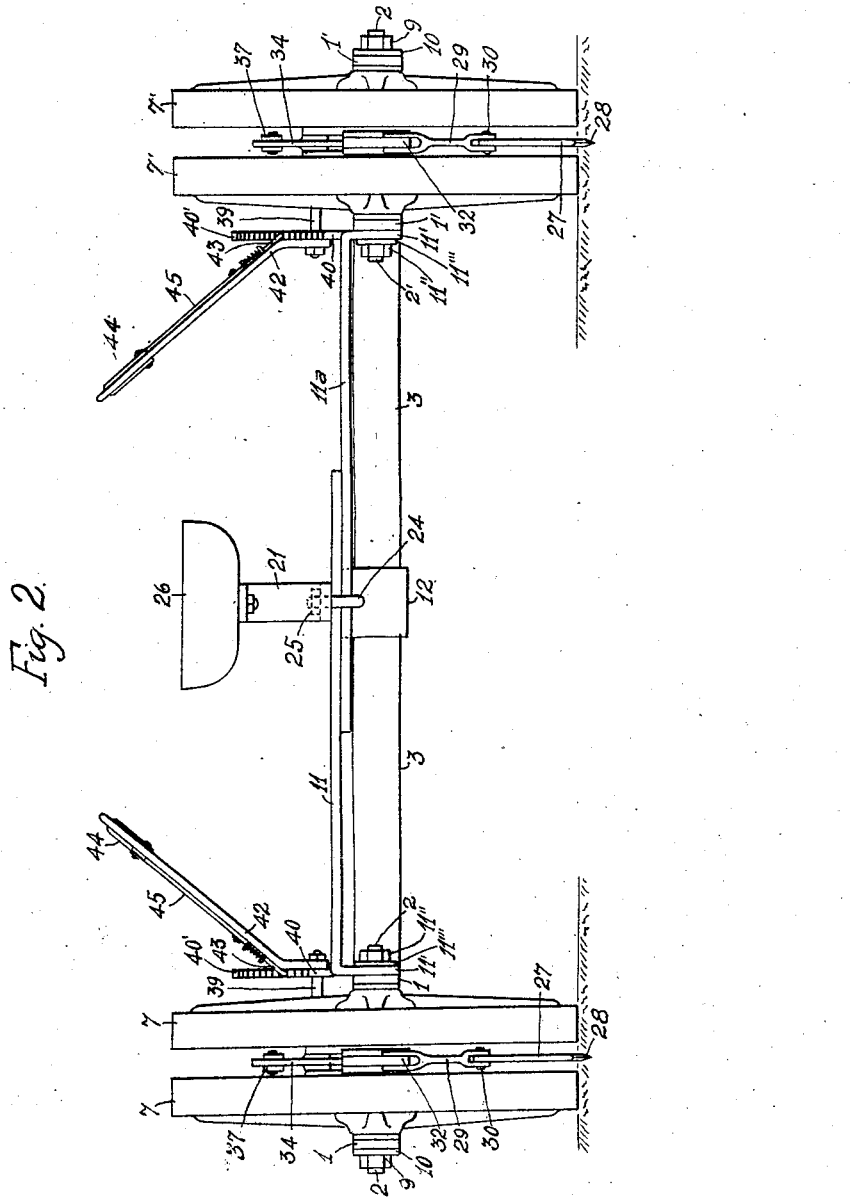
Figure 2 is a rear elevation of the same.
Figure 3:
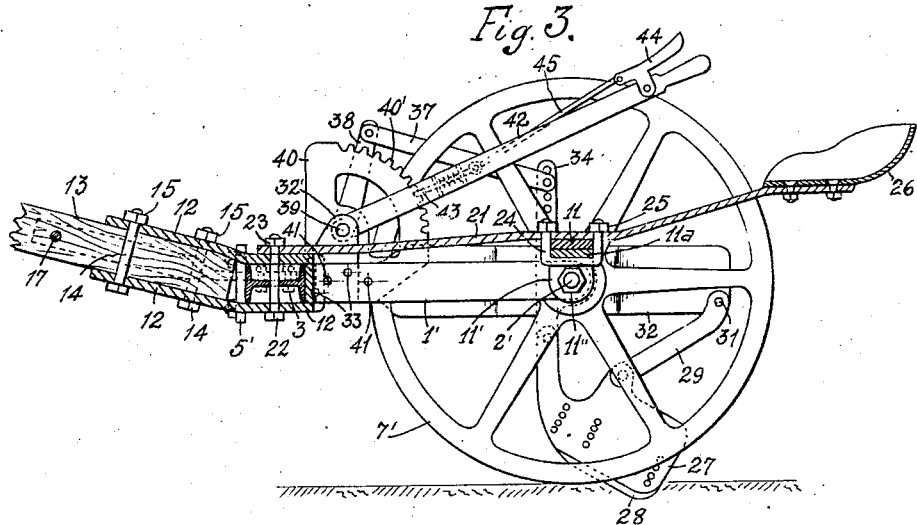
Figure 3 is a vertical section on line 3—3 of Fig. 1.
Figure 4:
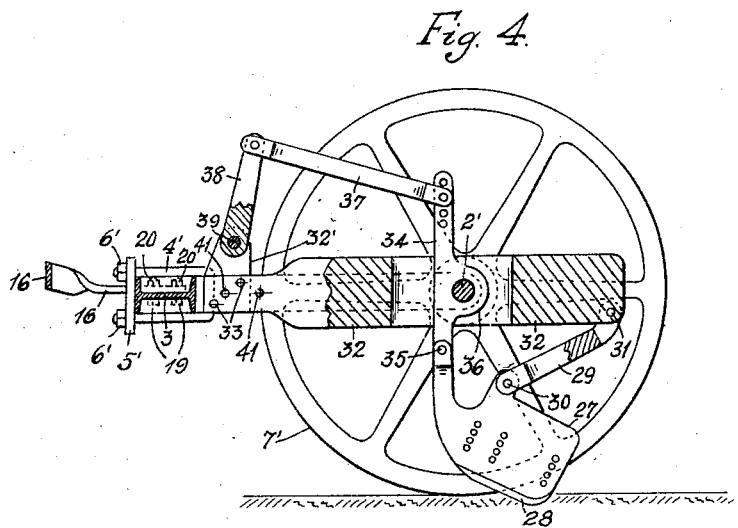
Figure 4 is a vertical section on line 4—4 of Fig. 1.

Referring to the drawings, 1 and 1' designate frames or chassis each of which comprises two spaced parallel beams bent to form rectangular front end portions and provided with and forming bearings at their rear ends for horizontal shafts 2 and 2'. Said frames are arranged in transverse alinement and separated from each other at their free ends. The general frame has a horizontal double T-section beam 3 extended in front of said chassis 1 and 1', and to which are united the front transverse portions of said chassis by means of two pairs of U-shaped braces 4 and 4' whose ends are connected together by means of small plates 5 and 5' tightened by nuts 6 and 6' screwed on the threaded ends of said braces. The chassis 1 and 1' are supported in elevated position by means of two pairs of wheels 7 and 7', the two wheels of each pair being arranged abreast of each other and somewhat spaced apart. Said wheels are mounted on shafts 2, 2' and held in place by nuts 9 and 9' which bear at their inner sides against washers 10 and 10'. The inner ends of shafts 2 and 2' are connected by two transverse plates 11 and 11ª partially superposed and which terminate in vertical lugs 11' which are arranged on the inner ends of said shafts 2 and 2' and are tightened against the inner beams 1 and 1' by nuts 11" and washers 11'''. The frame is completed by an extended brace 12 which surrounds the front beam 3 at the middle point of its length and in the front slot of the same a wooden pole 13 is adjustably secured by means of bolts 14 and nuts 15. The pole 13 is reinforced by bracing plates 16 which are fixed to its inner bent end by a horizontal bolt 17 and a nut 18. The outer ends of said plates are curved as shown and are fixed on the beam 3 by vertical bolts 19. The transverse plates 11 and 11ª support another longitudinal supporting plate 21 which is fixed on the brace 12 by means of a vertical bolt 22 and nut 23, the plate 21 being connected to plates 11 and 11ª by means of a brace 24 surrounding the plates 11 and 11ª and whose branches pass through holes in plate 21 and are fixed by nuts 25. Said plate 21 is raised somewhat at its rear end for supporting the driver's seat 26.

The cutting means for cutting the sugarcane straw, comprise a blade-holding plate 27, which is disposed below and between each of the wheels 7 and 7'. Plate 27 is of rectangular form and is disposed in an inclined position so as to present its lower edge at an acute angle to the soil. The plate 27 carries a cutting blade 28 which is suitably secured to the plates 27 so that its cutting edge projects below the lower edge of said plate 27. The plate 27 is supported by a link 29 pivoted at 30 thereto and at 31 to a frame member 32 of the chassis. Said member has a central slotted portion and is secured at its front end between the inwardly turned end lugs of beams 1 or 1' by bolts 33, as shown.

To permit vertical adjustment of the plates 27 carrying the cutting blades 28 and to elevate the same to avoid any obstruction or accumulation of straw, I provide a mechanism on each chassis 1 or 1' which comprises a lever 34 which is pivotally connected at 35 to the upper front end of plate 27 and which is formed intermediate its ends with an ear 36 which loosely surrounds shafts 2, 2'. The upper end of lever 34 is formed with a series of spaced openings for pivotally receiving one end of a link 37 and the opposite end of link 37 is pivotally connected to an arm 38 fixed to a horizontal shaft 39 journaled at one end in brackets 32' secured by screws 33 between the reduced end of member 32 and the end inwardly turned lugs of beams 1 or 1'. Said shaft 39 is mounted at the other end on a vertical plate 40 fixed by bolts and nuts 41 to the inner side of each chassis 1 or 1'. Fixed to each inner end of each shaft 39 is an operating lever 42 which is disposed at an angle with relation to the longitudinal axis of the apparatus and in such a position that it may be readily operated by a person on the seat 26. Mounted upon each lever 42 is a spring pressed pawl 43 which is adapted to engage the teeth 40' of a segment rack 40 formed for locking the lever 42 in any desired adjusted position. This pawl 43 is actuated in the ordinary manner by means of a bell crank lever 44 pivoted on the lever 42 and a connecting rod 45.

Although I have herein shown and described only one form of apparatus embodying my invention, it is to be understood that various changes and modifications may be made within the scope of this invention without departing from the spirit and scope of the appended claim.

What I claim is:

Apparatus of the class described, comprising a frame having a transverse bar and a draft tongue, pairs of rearwardly extending brackets connected to said bar adjacent its ends, an axle carried by each pair of brackets, spaced supporting wheels mounted on said axles, a frame element arranged between the brackets of each pair, connected at its front end to said brackets and provided with a vertical longitudinal slot at the point through which the associated axle extends, a lever pivotally mounted on each axle and arranged in the slot of one of said frame elements, a cutting knife pivotally connected to the lower end of each lever, a rigid link pivotally connecting the rear portion of each cutting knife with the rear end of one of said frame elements, a hand lever associated with each of said levers and having a pivotal shaft provided with an arm, said pivotal shafts having bearings in said brackets, a segment plate secured to the innermost of each of said brackets, a dog on each of said hand levers arranged for engagement with one of said segment plates to lock said hand lever in adjusted position and links connecting said arms with the upper portions of the first named levers.

In witness whereof I affix my signature.

JOSÉ B. RAMOS.